United States Patent Office 3,518,254
Patented June 30, 1970

3,518,254
SYNTHESIS OF 1,3-DIAZEPINO[1,2-a]
INDOLIN-1(2H)-ONES
Peter H. L. Wei, Upper Darby, and Stanley C. Bell, Penn Valley, Pa., assignors to American Home Products Corporation, New York, N.Y., a corporation of Delaware
No Drawing. Filed Nov. 9, 1967, Ser. No. 681,882
Int. Cl. C07d 53/02
U.S. Cl. 260—239.3
13 Claims

ABSTRACT OF THE DISCLOSURE

The disclosure teaches the preparation of novel 1,3-diazepino-[1,2-a]indolin-1(2H) - ones found to possess pharmacological activity in mammals, including central nervous system depressant action. The process unexpectedly forming these compounds involves the reaction of haloacylanilides with potassium or sodium cyanide.

---

The invention relates to novel tricycle, organic compounds and more particularly to 1,3-diazepino[1,2-a]indolin-1(2H)-ones, intermediates formed in their preparation, and to the process for producing them.

The process of the invention is carried out by treating approximately equimolar amounts of a 2' - acylhalopropionanilide with an alkali metal cyanide in an alcoholic solvent at refluxing temperature until reaction is completed, which will usually take place in about 15 to 20 hours. The results of the reaction produce a series of interesting compounds among which are the aforesaid 1,3-diazepino[1,2-a]indolin-1-(2H)-ones. These may be illustrated by the following structural formula representing pharmacologically useful compounds:

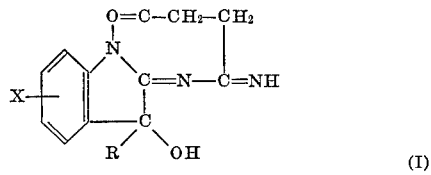

(I)

The reaction may be illustrated more particularly as follows:

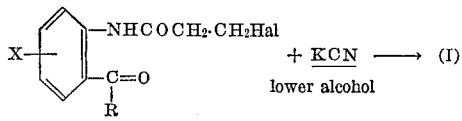

In the reaction shown above, Hal is intended to represent chlorine, bromine, or iodine, X is intended to represent hydrogen, halogen, lower alkyl or lower alkoxy of one to two carbon atoms while R is intended to stand for methyl or ethyl, phenyl, halophenyl, specifically chloro, bromo, or fluorophenyl or tolyl.

The starting organic reactants are known compounds and may easily be prepared by reacting a 2-aminophenylalkyl or aryl ketone with a 3-halopropionyl halide, for example, 3-chloropropionyl chloride.

To obtain a compound as represented by Formula I from the reaction described, solids are separated by filtration, the filtrate is partially concentrated and solids so formed are separated. The filtrate is then evaporated to dryness, and the solid product is purified and recrystallized.

The product obtained by the reaction has been identified under standard analytical testing procedures as a crystalline solid having the structural configuration of 1,3-diazepino[1,2-a]indolin-1(2H) - ones, illustrated as Formula I. It is believed that the final product is formed through a series of intermediates wherein the initial reaction product is a 2'-acyl-3-cyanopropioanilide which probably converts during the reaction to a 3-cyanopropionyl-2-amino-3-indolinol having also in the 3-position a lower alkyl or acyl radical more specifically illustrated as having the formula:

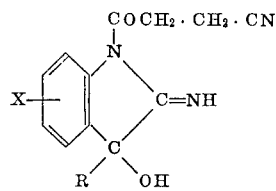

(X and R having the meanings indicated previously) and, finally, into the aforesaid compound of structure I.

Compounds falling within the scope of the invention have been found to be pharmacologically active, demonstrating central nervous system depressant action when tested under standard testing procedures in mice at a dosage range between 100 and 150 mg./kg., administered parenterally. In addition, when tested in rats, compounds of the invention also showed, by standard procedure, anti-inflammatory activity at a dosage of 25 to 35 mg./kg., also administered parenterally. Specifically, the best mode for eliciting notable CNS depressant activity is by administration of the compound through the intraperitoneal (i.p.) route at a dosage of 127 mg./kg., in mice. For eliciting the anti-inflammatory action, the best action is found at a dose of 30 mg./kg., in rats by i.p. route.

On the basis of the tests carried out as aforesaid, the compounds of the invention are deemed particularly useful in the field of experimental or comparative pharmacology in the treatment of mammals for sedative effects.

In administering the compounds to obtain the effect desired, the active compound may be used alone, or in admixture with other known compounds active in the same catagory. They may be used with or without standard diluents, or excipients, or carriers of the usual type. For parenteral use, water is usually used as a carrier and solubilizer for the active substance.

The following examples are given for illustrative purposes only, and not to be construed as limitative of the invention. The final products indicated therein are to be taken as having essentially the pharmacologic activity indicated previously.

EXAMPLE 1

8-chloro-3,4-dihydro-6-hydroxy-4-imino-6-phenyl-[1,3]diazepino[1,2-a]indolin-1(2H)-one, hemiethanolate To 129 g. of 2 - benzoyl - 3,4'-dichloropropionanilide in 1 l. of ethanol was added a solution of 31.2 g. of KCN in 50 ml. of water. The solution we refluxed for 18 hours, filtered from insoluble salt and the filtrate partially concentrated. The solid that formed was filtered off and the remaining liquid filtrate concentrated to dryness, triturated with cyclohexane, and recrystallized from ethanol giving the product, M.P. 202–205° C.

Analysis.—Calcd. for $C_{18}H_{14}ClN_3O_2 \cdot \frac{1}{2}C_2H_5OH$ (percent): C, 62.90; H, 4.72; Cl, 9.77; N, 11.58. Found (percent): C, 63.16; H, 4.47; Cl, 9.8; N, 11.3.

Following the procedure of Example 1, equimolar amounts of Na or KCN and 2'-benzoyl-4'-methyl-or 4'-ethoxy-3-chloropropionanilide will produce the corresponding 8-methyl or 8-ethoxy diazepino indolin-one in the filtrate fraction.

EXAMPLE 2

3,4 - dihydro - 6 - hydroxy - 4 - imino - 6 - methyl-[1,3]diazepino[1,2-a]indolin - 1(2H) - one was prepared from 2'-acetyl-3-chloropropionanilide and potassium cyanide according to the procedure of Example 1; M.P. 218–220° C.

*Analysis.*—Calcd. for $C_{13}H_{13}N_3O_2$ (percent): C, 64.18; H, 5.39; N, 17.28. Found (percent): C, 64.10; H, 5.28; N, 17.32.

EXAMPLE 3

8 - chloro - 6 - o - chlorophenyl - 3,4 - dihydro - 6-hydroxy - 4 - imino[1,3] - diazepino[1,2 - a]indolin-1(2H)-one was prepared from 2'-o-chlorobenzoyl-3,4'-chloropropiononitride and potassium cyanide according to the procedure of Example 1; M.P. 258–260° C.

*Analysis.*—Calcd. for $C_{18}H_{13}Cl_2N_3O_2$ (percent): C, 57.77; H, 3.50; Cl, 18.95; N, 11.23. Found (percent): C, 57.56; H, 3.60; Cl, 19.1; N, 11.61.

Instead of the 2'-o-chloro substituent on the benzoyl radical of the starting material, we may have an o-, m-, or p-methyl substituent thereby forming the corresponding 8-chloro-6-tolyl diazepino-indolin-one.

What is claimed is:

1. The process comprising heating a compound having the formula:

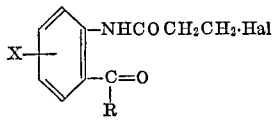

in which X represents a substituent of the group consisting of hydrogen and chlorine, R stands for a member of the group consisting of lower alkyl of 1 to 2 carbon atoms, phenyl, halophenyl and methylphenyl, while Hal is either chlorine, bromine, or iodine, with an alkali-metal cyanide in an aqueous alkanol solvent under refluxing conditions for about 18 hours and separating from the liquid fraction of the reaction products, a compound having the formula:

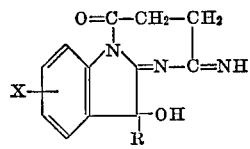

in which X and R are as indicated above with the proviso that when X is chlorine it is attached at the 8-position.

2. The process of claim 1, wherein X and Hal both represent chlorine and R represents phenyl.

3. A compound having the formula:

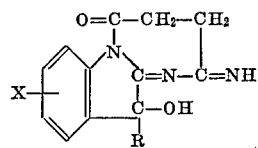

wherein X stands for a member of the group consisting of hydrogen and chlorine with the proviso that when X is chlorine it is in the 8-position; and R is a member of the group consisting of lower alkyl of 1 to 2 carbon atoms, phenyl, halophenyl, and tolyl.

4. The compound of claim 3, wherein X is hydrogen and R is methyl.

5. The compound of claim 3, wherein X is a member of the group consisting of chlorine and bromine, and R is phenyl.

6. The compound of claim 3, wherein X is chlorine and R is chlorophenyl.

7. A compound of claim 3, wherein X is chlorine and R is a lower alkyl of 1 to 2 carbon atoms.

8. A compound of claim 3, wherein X is chlorine and R is phenyl.

9. A compound of claim 3, wherein X is chlorine and R is halophenyl.

10. A compound of claim 3, wherein X is chlorine in the 8-position of the diazepino-indolinone structure and R is methyl.

11. A compound of claim 3, wherein X is chlorine in the 8-position of the diazepino-indolinone structure and R is chlorophenyl.

12. As a compound of claim 3; 8-chloro-3,4-dihydro-6-hydroxy-4-imino-6-phenyl-[1,3]diazepino[1,2-a]indolin-1(2H)-one.

13. As a compound of claim 3; 8-chloro-6-o-chlorophenyl-3,4-dihydro-6-hydroxy-4-imino - [1,3]diazepeino-[1,2-a]indolin-1(2H)-one.

References Cited

UNITED STATES PATENTS 3,316,251   4/1967   Schmidt _____ 260—239.3

HENRY R. JILES, Primary Examiner

R. T. BOND, Assistant Examiner

U.S. Cl. X.R.

424—244; 260—562, 326.11

PO-1050
(5/69)

UNITED STATES PATENT OFFICE
CERTIFICATE OF CORRECTION

Patent No. 3,518,254           Dated June 30, 1970

Inventor(s) Peter H. L. Wei and Stanley C. Bell

It is certified that error appears in the above-identified patent and that said Letters Patent are hereby corrected as shown below:

In column 1, line 35 the formula should read:

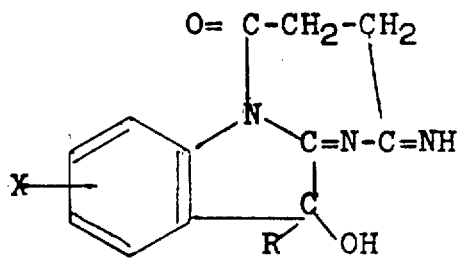

In column 2, line 3 "amino" should read --imino--

In column 2, line 53 "2-benzoyl" should read --2'-benzoyl--

In column 2, line 55 "we" should read --was--

SIGNED AND
SEALED
DEC 1 1970

(SEAL)
Attest:

Edward M. Fletcher, Jr.
Attesting Officer

WILLIAM E. SCHUYLER, JR.
Commissioner of Patents